US005315317A

United States Patent [19]

Terasawa et al.

[11] Patent Number: 5,315,317

[45] Date of Patent: May 24, 1994

[54] INK QUANTITY DETECTING DEVICE AND RECORDING APPARATUS WITH THE DEVIE

[75] Inventors: Koji Terasawa, Mitaka; Makoto Takemura; Takashi Nojima, both of Tokyo; Akira Miyakawa, Tanashi, all of Japan

[73] Assignee: Canon Kabushiki Kaisha, Tokyo, Japan

[21] Appl. No.: 121,251

[22] Filed: Sep. 15, 1993

Related U.S. Application Data

[63] Continuation of Ser. No. 554,793, Jun. 28, 1990, abandoned.

[30] Foreign Application Priority Data

Jun. 29, 1989 [JP] Japan ................................ 1-167614
Jun. 29, 1989 [JP] Japan ................................ 1-167615

[51] Int. Cl.$^5$ ........................ G01D 9/00; G01D 15/18; B41J 2/01; G01F 23/00

[52] U.S. Cl. ................................ 346/1.1; 346/140 R; 400/126; 73/304 R

[58] Field of Search ...................... 346/140 R, 1.1, 75; 400/126; 73/304 R

[56] References Cited

U.S. PATENT DOCUMENTS

| | | | |
|---|---|---|---|
| 4,276,554 | 6/1981 | Terasawa | 346/140 |
| 4,313,124 | 1/1982 | Hara | 346/140 |
| 4,345,262 | 8/1982 | Shirato et al. | 346/140 |
| 4,422,084 | 12/1983 | Saito | 346/140 R |
| 4,447,820 | 5/1984 | Terasawa | 346/140 R |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 |
| 4,604,633 | 8/1986 | Kimura et al. | 346/140 R |
| 4,636,814 | 1/1987 | Terasawa | 346/140 R |
| 4,719,475 | 1/1988 | Kiyohara | 346/140 |
| 4,723,129 | 2/1988 | Endo et al. | 346/1.1 |
| 4,740,796 | 4/1988 | Endo et al. | 346/1.1 |

FOREIGN PATENT DOCUMENTS

| | | |
|---|---|---|
| 0287098 | 10/1988 | European Pat. Off. . |
| 3529805 | 2/1987 | Fed. Rep. of Germany . |
| 3708865 | 10/1987 | Fed. Rep. of Germany . |
| 59-123670 | 7/1984 | Japan . |
| 59-138461 | 8/1984 | Japan . |
| 60-32667 | 2/1985 | Japan . |
| 63-257643 | 10/1988 | Japan . |
| WO90 00971 | 2/1990 | PCT Int'l Appl. . |

*Primary Examiner*—Benjamin R. Fuller
*Assistant Examiner*—Eric Frahm
*Attorney, Agent, or Firm*—Fitzpatrick, Cella, Harper & Scinto

[57] ABSTRACT

An ink quantity detecting device includes a plurality of ink chambers for containing inks, displacement members each provided for a corresponding one of the ink chambers and capable of being displaced in accordance with a quantity of a corresponding ink, a coupling member for coupling a plurality of displacement members, and a detecting unit for detecting displacement of at least one of the displacement members or the coupling member. The coupling member can be displaced in accordance with a quantity of at least one ink.

28 Claims, 5 Drawing Sheets

INK QUANTITY DETECTING DEVICE AND RECORDING APPARATUS WITH THE DEVIE

This application is a continuation of application Ser. No. 07/554,793, filed Jun. 28, 1990, now abandoned.

BACKGROUND OF THE INVENTION:

1. Field of the Invention

The present invention relates to a recording apparatus for use in, e.g., a copying machine, a facsimile system, a video output printer, and a word processor and, more particularly, to an ink quantity detecting device of a recording apparatus using different types of ink.

2. Related Background Art

Recording apparatuses such as a printer or a facsimile apparatus can be classified in accordance with a recording system into, e.g., a thermal system, a wire dot system, and an ink jet system.

In the ink jet system (ink jet recording apparatus), an ink is supplied to a recording head having at least one small orifice as a discharge port, and an energy generator provided in correspondence with the orifice is driven on the basis of printing data, thereby forming bubbles by a film boiling phenomenon of the ink in the orifice. Ink droplets are ejected from the orifice upon expansion and shrinkage of the bubbles, and the ejected ink droplets are adhered on a recording member such as plain paper or a thin plastic plate, thereby forming dot patterns.

In an ink jet recording apparatus of this type, an ink is supplied to the recording head from an ink container called an ink tank or an ink cartridge mounted in the apparatus or a carriage via a tube or the like. Since the ink capacity of the ink container is limited, however, the supply of ink remaining becomes small to interfere with subsequent recording when a recording operation progresses to a certain degree. Therefore, the apparatus is arranged such that a decrease in the supply of the ink remaining to a reference quantity is detected by a certain method to alarm an operator before the ink is used up, thereby demanding the operator to replenish the ink or replace the cartridge.

An optical system or an electrode system is conventionally known as a typical ink quantity detecting means for an ink container. The optical system is suitable for an arrangement in which the ink container has a surface which can be opened by a cover. In the optical system, a detection signal is generated by utilizing an event in which light emitted from a light-emitting portion reaches a light-receiving portion when the ink liquid surface is lowered. In the electrode system, a pair of electrodes are horizontally arranged near a predetermined liquid surface level with a predetermined interval therebetween, and a signal is generated by utilizing an event in which an electric resistance abruptly rises when the electrodes are exposed to the air.

In addition to the above systems, a pressure detecting system is available. In the pressure detecting system, a pressure sensor is arranged in an ink bag such as an aluminum laminated bag, and the supply of ink remaining is detected on the basis of a pressure change.

The present inventors found, however, that when such an ink quantity detecting device is applied to a recording apparatus using at least two different types of ink, the following technical problems to be solved arise.

For example, U.S. Pat. No. 4,719,475 discloses an arrangement in which electrodes arranged in a plurality of ink tanks are connected in series with each other to detect an ink quantity.

Japanese Laid-Open Patent Application No. 60-32667 discloses an arrangement in which light is radiated on a transparent portion formed in an ink tank and a quantity and a color of light transmitted through a light guide are observed to detect an ink quantity.

In each of the above conventional ink container ink quantity detecting devices, however, if the optical system or the electrode system is used as the detecting means, the stability of ink may be degraded over a long time period, i.e., the quality of ink may be degraded especially when the ink is left to stand at a high temperature.

In this case, the quality of an image is degraded when recording is performed in a color recording apparatus for a long time.

Especially in the above arrangement in which electrodes are connected in series with each other, in order to select a resistance range which can be sensitively detected, a voltage must be increased since resistive components are increased due to an ink. As a result, the above-mentioned influence on the ink is enhanced.

The pressure detecting system has no influence on ink performance. However, if a pressure sensor is arranged for each color in order to apply the system to a color recording apparatus, the size of the apparatus is increased, and manufacturing cost of additional mechanisms is increased.

SUMMARY OF THE INVENTION

It is an object of the present invention to provide an ink container ink quantity detecting device which can solve the above conventional technical problems and detect an ink quantity by pressure detection for each of a plurality of ink colors with a simple and compact arrangement and low cost and a recording apparatus with the detecting device.

It is another object of the present invention to provide an ink quantity detecting device which can indicate a detected remaining supply of each of a plurality of inks of different colors with a simple arrangement by using a smaller number of indicators than the number of inks of different colors and a recording apparatus with the detecting device.

It is still another object of the present invention to provide an ink quantity detecting device comprising:

a plurality of ink chambers for containing inks;

displacement members each provided for a corresponding one of the ink chambers and capable of being displaced in accordance with a quantity of a corresponding ink;

a coupling member for coupling a plurality of displacement members; and detecting means for detecting displacement of at least one of the displacement members or the coupling member, wherein the coupling member can be displaced in accordance with a quantity of at least one ink.

DETAILED DESCRIPTION OF THE PREFERRED EMBODIMENTS

In a preferred embodiment of the present invention, pressure-sensitive members as displacement members each of which can be displaced in accordance with an ink quantity in an ink tank and/or a pressure-sensitive chamber are provided in a plurality of pressure-sensitive chambers provided as ink chambers in correspondence with the number of types of ink whose quantity is to be detected, and a coupling member is arranged to interlock and displace the displacement members. When a quantity of at least one ink is reduced below a predetermined quantity, this reduction is detected to drive an output means, e.g., a display means such as a display or an alarming means such as a buzzer so as to inform this to a user.

The displacement member need not be linearly displaced but may be displaced continuously or stepwise in accordance with an ink quantity. For example, the displacement member may be binary-displaced such that a switch is turned on/off on the basis of a predetermined quantity of ink.

Although the displacement members provided in the liquid chambers are interlocked with each other, these members are combined by the coupling member or formed integrally with each other.

The displacement members coupled by the coupling member need not be integrally coupled but may be loosely coupled with margins therebetween to absorb small variations. A means for detecting a displacement amount may be of an electrical or optical type. Displacement amount detection may be performed by detecting displacement of the coupling member or detecting displacement of at least one pressure-sensitive member.

If a plurality of ink chambers are overlapped and integrally formed, a most compact arrangement can be obtained. However, these chambers may be separated from each other within the range of the above technical principle.

After an ink quantity detecting device for monocolor recording is described, embodiments of the present invention will be described in detail.

Figure 1:
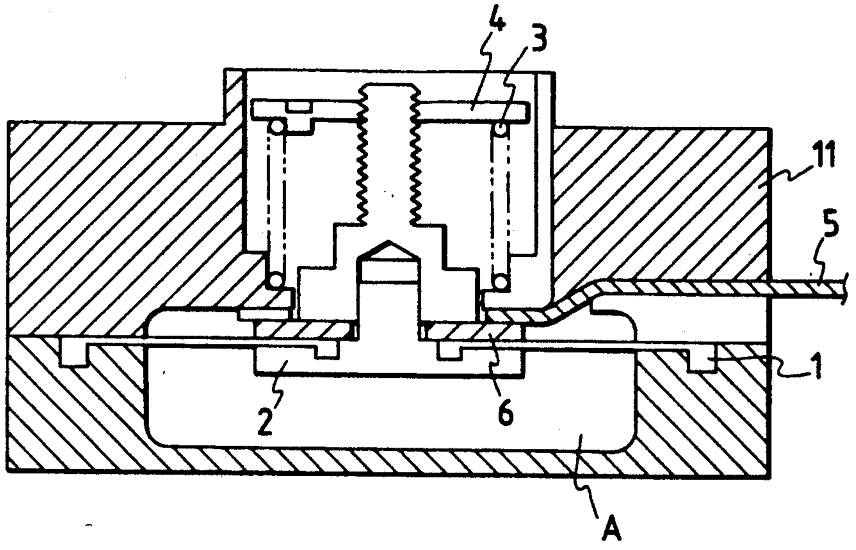
FIG. 1 is a schematic sectional view for explaining an ink quantity detecting device.

FIG. 1 is a schematic sectional view showing an arrangement of an ink quantity detecting device based on a pressure detecting system.

A diaphragm-shaped pressure-sensitive member 1 constitutes a part of a pressure-sensitive chamber A as a liquid chamber by using an elastic material and is displaced in accordance with an ink pressure. A coupling member 2 fixes an annular electrode to a central portion of the pressure-sensitive member 1, has a male threaded portion at its central portion, and is displaced together with the pressure-sensitive member in accordance with the ink pressure. An adjustment elastic member 3 is arranged concentrically with the male threaded portion of the coupling member 2 and biases the coupling member 2 downward. An adjusting member 4 is threadably engaged with an upper portion of the male threaded portion and regulates the position of the upper end of the adjustment elastic member 3. Output contacts 5 are fixed to a housing 11 (to be described later) so that they are arranged symmetrically about the action center and the lower surfaces of their inserted end portions are exposed and have lead portions exposed outside the housing. A contact 6 is inserted and fixed in the coupling member 2 so as to be in contact with a pair of output contacts 5. The housing 11 is divided into upper and lower portions, supports and fixes the respective members, and is made of an insulating material such as a resin.

The pressure-sensitive chamber A communicates with an ink supply portion of an ink container (not shown) such as an ink tank, an ink bag, or an ink cartridge and receives ink. When no ink is present in the pressure-sensitive chamber A, the coupling member 2 is moved downward against a biasing force of the adjustment elastic member 3 to separate the contact 6 from the output contacts 5.

In the above arrangement, when a predetermined quantity of an ink or more is contained in the ink container, the ink pressure in the pressure-sensitive chamber A is substantially equal to, e.g., the atmospheric pressure and therefore urges the pressure-sensitive member 1 and the coupling member 2 upward by the biasing force of the adjustment elastic member 3, thereby urging the contact 6 against the output contacts 5 to set a switch ON state.

When the ink in the ink container is consumed close to, e.g., zero, the ink pressure abruptly falls to produce a negative pressure in the ink container. This negative pressure cancels the upward urging force of the pressure-sensitive member 1 with respect to the coupling member 2. Therefore, the pressure-sensitive member 1 and the coupling member 2 are moved downward by against the biasing force of the adjustment elastic member 3 to separate the contact 6 from the output contacts 5. As a result, the supply of ink remaining can be detected even when the interior of the ink container is closed.

The ink quantity detecting device for use in a recording apparatus for mono color has been described above. An ink quantity detecting device for use in a recording apparatus using a plurality of types of ink will be described in detail below as an embodiment of the present invention.

1st Embodiment

The present invention will be described in detail below with reference to FIGS. 2 to 4.

Figure 2:
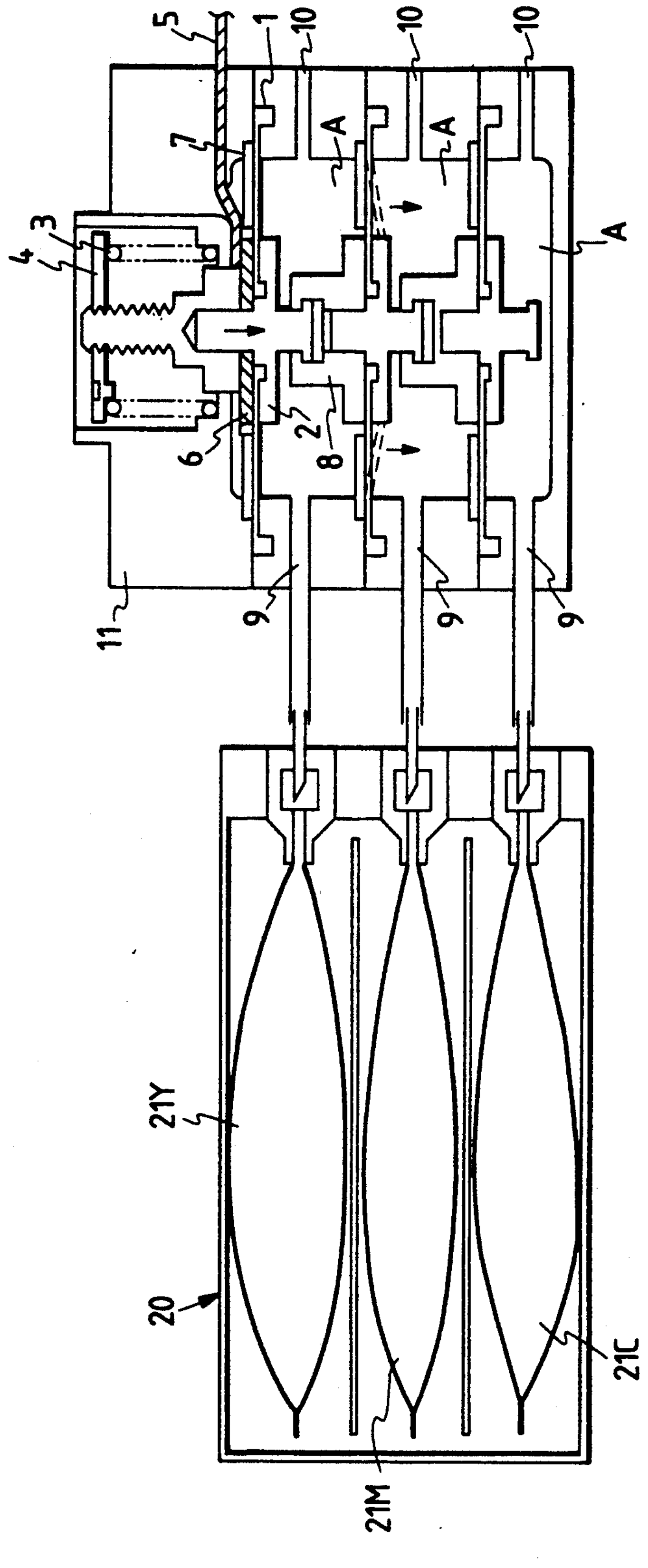

FIG. 2 is a schematic sectional view showing the first embodiment of the present invention having three pressure-sensitive chambers. In this embodiment, the same reference numerals as in FIG. 1 denote the same parts and a detailed description thereof will be omitted.

According to this embodiment as shown in FIG. 2, second and third pressure-sensitive members 1 are vertically overlapped below the pressure-sensitive chamber A as a liquid chamber shown in FIG. 1 in accordance with the number of ink colors, thereby forming a plurality of pressure-sensitive chambers A. When a negative pressure is produced in any of the pressure-sensitive chambers A, coupling members 2 are moved downward to separate a contact 6 from output contacts 5.

Figure 5:
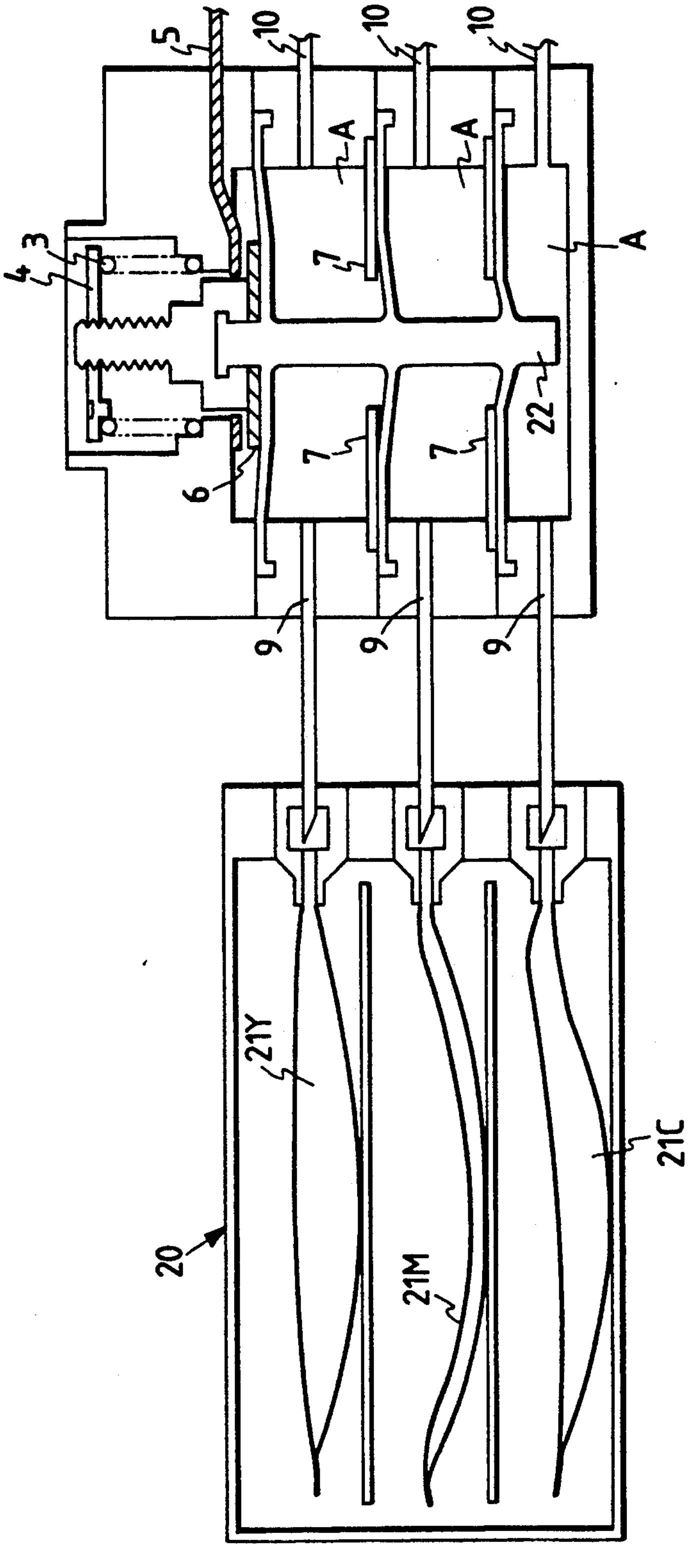
FIG. 5 is a schematic sectional view for explaining an ink quantity detecting device for a color recording apparatus according to the present invention.

Referring to FIG. 2, regulating members 7 regulate the movements of the second and third pressure-sensitive members 1 in one direction. Coupling members 8 are fixed to central portions of the second and third pressure-sensitive members 1 and another coupling member 8 is vertically connected in series with the first pressure-sensitive member 1, thereby transmitting a pressure with respect to any of the pressure-sensitive member to the uppermost coupling member 2. Ink inlet and outlet ports 9 and 10 communicate with each of the pressure-sensitive chambers A. That is, this embodiment is characterized in that the pressure-sensitive chambers A in a number corresponding to the number of ink colors are overlapped and formed in the lower portion in the arrangement as shown in FIG. 5.

Referring to FIG. 2, an ink container 20 has ink bags 21Y, 21M, and 21C respectively containing inks of three colors, i.e., yellow (Y), magenta (M), and cyan (C). An ink outlet port of each ink bag is coupled via a tube to the corresponding ink inlet port 9 which communicates with the corresponding pressure-sensitive chamber A, as shown in FIG. 2. The ink container is preferably detachable with respect to the apparatus.

The ink bag consists of a flexible material such as an aluminum laminated thin film or an aluminum deposited thin film so that the bag is easily deformed in accordance with consumption of an ink as ink droplets are discharged from a recording head, thereby maintaining a substantially atmospheric pressure in the bag.

In the above arrangement, the ink in the ink bag is supplied to fill the pressure-sensitive chamber A which communicates with the bag, and a necessary quantity of ink is supplied through the outlet port 10 from the pressure-sensitive chamber A to a recording head (not shown). When a sufficient supply of ink remains in the ink bag, the pressure in the pressure-sensitive chamber A is substantially equal to the atmospheric pressure. Therefore, the pressure-sensitive member 1 is horizontally positioned, and the contact 6 is urged against the output contacts 5 by a biasing force of an elastic member 3 to set a switch ON state.

Figure 3:
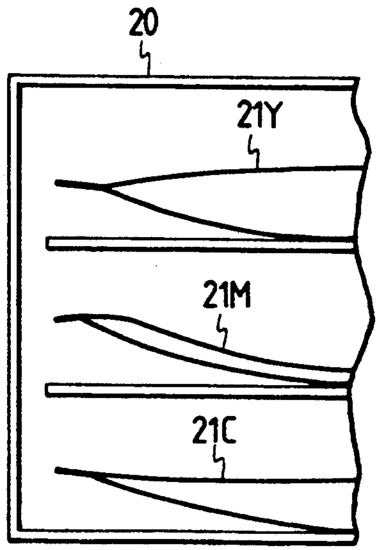
FIGS. 2 and 3 are schematic sectional views for explaining an ink quantity detecting device for a color recording apparatus according to the present invention.

According to findings an ink in an ink bag becomes flat in accordance with the ink consumption quantity as shown in FIG. 3 as a recording operation progresses. When the supply of ink remains becomes close to zero as shown in FIG. 4, the ink pressure abruptly falls to produce a negative pressure in the ink bag. For example, when a negative pressure is produced in the ink bag 21M, the middle pressure-sensitive member 1 is moved downward by the negative pressure to a position indicated by a broken line. Since the pressure-sensitive member 1 is moved downward, the coupling member 2 connected to the pressure-sensitive member 1 is also moved downward. The annular contact 6 arranged concentrically on the coupling member 2 is moved downward together with the coupling member 2 so as to be separated from the output contacts 5. Therefore, when at least one of inks of three colors of ink is substantially used up, the switch state is changed from ON to OFF, thereby detecting an ink remain by one detection switch.

Figure 4:
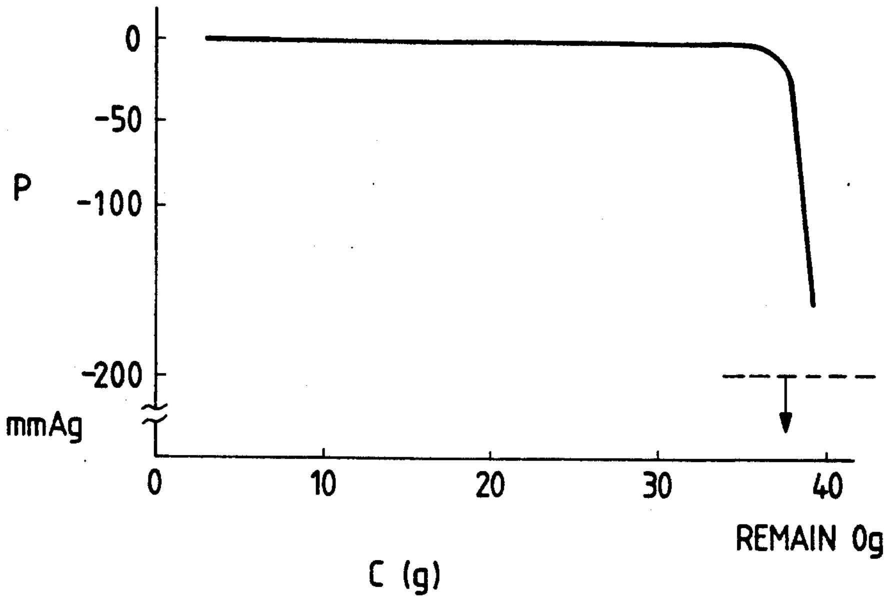
FIG. 4 is a graph for explaining a relationship between an ink quantity and an ink pressure.

FIG. 4 is a graph showing a relationship between an ink pressure P and an ink consumption C obtained in an ink bag containing 40 g of an ink. When a supply of ink remaining is decreased to several grams, a negative pressure in the bag is abruptly increased.

A negative pressure beyond which the recording head cannot discharge an ink is, e.g., 200 mmAg or less as indicated by a broken line in FIG. 4. Therefore, by controlling the device to detect the supply of ink remaining when the negative pressure is about −100 mmAg, a large detection margin can be set.

2nd Embodiment

FIG. 5 is a schematic sectional view showing the second embodiment of the present invention.

The second embodiment differs from the first embodiment in that pressure-sensitive members and coupling members are integrally formed by using an elastic material to constitute a displacement member 22, thereby providing a multicolor ink pressure detection mechanism with a further simplified arrangement and lower cost.

As described above, the present invention has arrangements as disclosed in the first and second embodiments. That is, displacement members of pressure-sensitive chambers, provided in a number corresponding to the number of colors of inks contained in an ink container, are arranged to be interlocked with the pressure-sensitive chambers for driving a pressure-responsive switch and are critically changed by mechanical displacement when at least one of the pressures in the pressure-sensitive chambers is reduced to be substantially 0 while pressure changes in the pressure-sensitive chambers are added. Therefore, the suply of ink remaining detection can be performed for a plurality of ink colors by using a single pressure-responsive switch.

In addition, serially arranged pressure-sensitive chambers for a plurality of inks of different colors are formed such that coupling members in a number corresponding to the number of ink colors are serially coupled to a coupling member for driving a pressure-responsive switch and a pressure-sensitive member for each ink color is mounted on each of the added coupling members. Therefore, a more compact size can be realized by a simple arrangement with low cost.

The third and fourth embodiments of the present invention will be described below.

In a recording apparatus using a plurality of ink colors as in full color recording, an ink remain detecting means having the arrangement shown in FIG. 1 is connected to each of ink bags containing a plurality of inks of different colors. In addition, an indicator for outputting the supply of ink remaining can be provided for each ink color.

In the ink jet recording apparatus of this type, however, if an ink container uses a plurality of inks of different colors, the supply of ink remaining detecting means and the indicator must be provided for each ink color. As a result, the arrangement of the apparatus may be complicated to increase the size and the manufacturing cost.

In addition, since an ink of each different color must be replaced, the recording apparatus must be stopped upon each replacement. Therefore, the operability of the apparatus may be degraded.

It is, therefore, an object of the third embodiment of the present invention to provide an ink jet recording apparatus which can indicate a detected supply of ink remaining of each of a plurality of inks of different colors by using a smaller number of indicators than the number of inks of different colors with a simple arrangement.

In order to achieve the above object, according to the third embodiment, a single indicator indicates a detected ink remain of each of a plurality of inks of different colors contained in a single color ink container.

In a recording apparatus in which a black ink container for containing black ink as a main ink for use in recording is provided in addition to a color ink container for containing a secondary ink in recording, an indicator for indicating a supply of ink remaining of the black ink container and a supply of ink remaining detecting means thereof are preferably independently provided so that replacement of black ink and color ink can be independently performed.

In order to further decrease the manufacturing cost, different indication methods are preferably adopted, i.e., an ON period of a single indicator is preferably changed between color ink remaining supply indication and black ink supply remaining indication so that the single indicator can independently indicate ink supply remaining of black and color inks.

With this arrangement, the indicator is driven when ink supply remaining detection of any ink color is output, and ink replacement is alarmed even if the quantities of inks of other colors are a predetermined quantity or more. Therefore, the arrangement for ink remaining detection can be simplified.

Furthermore, black ink remain detection and color ink remain detection are independently performed, and the detected supply remains are independently indicated. Therefore, an operator can check which of black ink and color ink has a quantity reduced below a predetermined quantity.

Moreover, since supply remaining indication of black ink and that of color ink are performed at different ON periods (e.g., a long flashing period for black ink and a short flashing period for color ink), an operator can recognize the type of ink whose supply remaining is indicated from different ON modes. Therefore, supply remaining indication of black ink and color ink can be performed by a single indicator.

3rd Embodiment

Another embodiment of the present invention will be described in detail below with reference to FIGS. 6 and 7.

Figure 6:
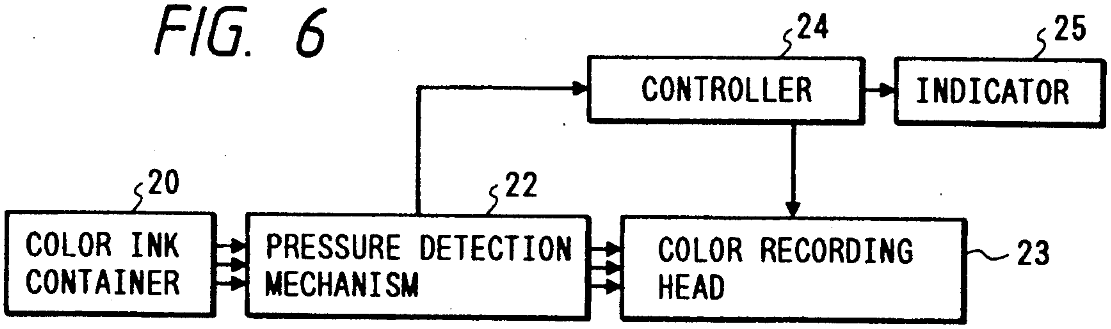
FIG. 6 is a block diagram showing a control system according to an embodiment of the present invention.

FIG. 6 is a block diagram showing a control system of the third embodiment of the present invention.

In an ink remain detection mechanism according to the present invention, second and third pressure-sensitive members 1 are vertically arranged below the pressure-sensitive chamber shown in FIG. 1 in correspondence with the number of ink colors to form a plurality of pressure-sensitive chambers A. In this mechanism, similar to those shown in FIGS. 2 and 5, when a negative pressure is produced in any pressure-sensitive chamber A, coupling members 2 are moved downward to separate a contact 6 from output contacts 5.

Referring to FIG. 2, regulating members 7 regulate the movements of the second and third pressure-sensitive members 1 in one direction. Coupling members 8 are fixed to central portions of the second and third pressure-sensitive members 1 and another coupling member 8 is vertically coupled in series with the first pressure-sensitive member 1 to transmit a pressure on any pressure-sensitive member to the uppermost coupling member 2. Ink inlet and outlet ports 9 and 10 communicate with each pressure-sensitive chamber A. That is, the arrangement shown in FIG. 2 is characterized in that the pressure-sensitive chambers A in a number corresponding to the number of ink colors are overlapped in the lower portion.

The mechanical arrangement of the ink quantity detecting device is the same as those of the first and second embodiments and a detailed description thereof will be omitted. When supply detection of a main ink and a plurality of secondary inks is to be performed by at least two ink quantity detecting devices, the device shown in FIG. 1 is used in combination with the device shown in FIG. 2 or 5.

An arrangement of the control system shown in FIG. 6 will be described below.

A color recording head 23 which communicates with the outlet ports 10 is connected to a pressure detection mechanism 22 having the arrangement shown in FIG. 2 or 5. Ink discharging of the color recording head 23 is controlled by a controller 24 which receives a contact output from the pressure detection mechanism 22 as one of input information. The controller 24 is connected to an indicator 25 and indicates a detected ink remain on the indicator 25 on the basis of contact OFF of the pressure detection mechanism 22.

According to the arrangement shown in FIG. 6, when an ink quantity of any of ink bags 21Y, 21M, and 21C of a color ink container 20 is consumed below a predetermined quantity, a pressure-sensitive member of a pressure-sensitive chamber communicating with the ink bag responds to separate the contact 6 from the output contacts 5. The controller 24 determines the contact OFF and indicates predetermined contents on the indicator 25. When a liquid crystal display (LCD) or the like which can display characters is used as the indicator 25, replacement of the ink bag can be alarmed by a written sentence. Since the indicator 25 is driven when an ink quantity of any of a plurality of ink bags is reduced below a predetermined amount, the color ink container 20 is removed from the recording apparatus even if sufficient quantities of ink remain in the other ink bags. Therefore, an event in which ink bags of a plurality of colors are removed from the recording apparatus and replaced in turn hardly occurs.

The color ink container removed from the apparatus can be used again as a color ink container after an ink is filled in an empty ink bag or the empty ink bag is replaced. Since only one of a plurality of ink colors is not excessively used in normal color recording, the operability of the apparatus is satisfactory.

4th Embodiment

Figure 7:
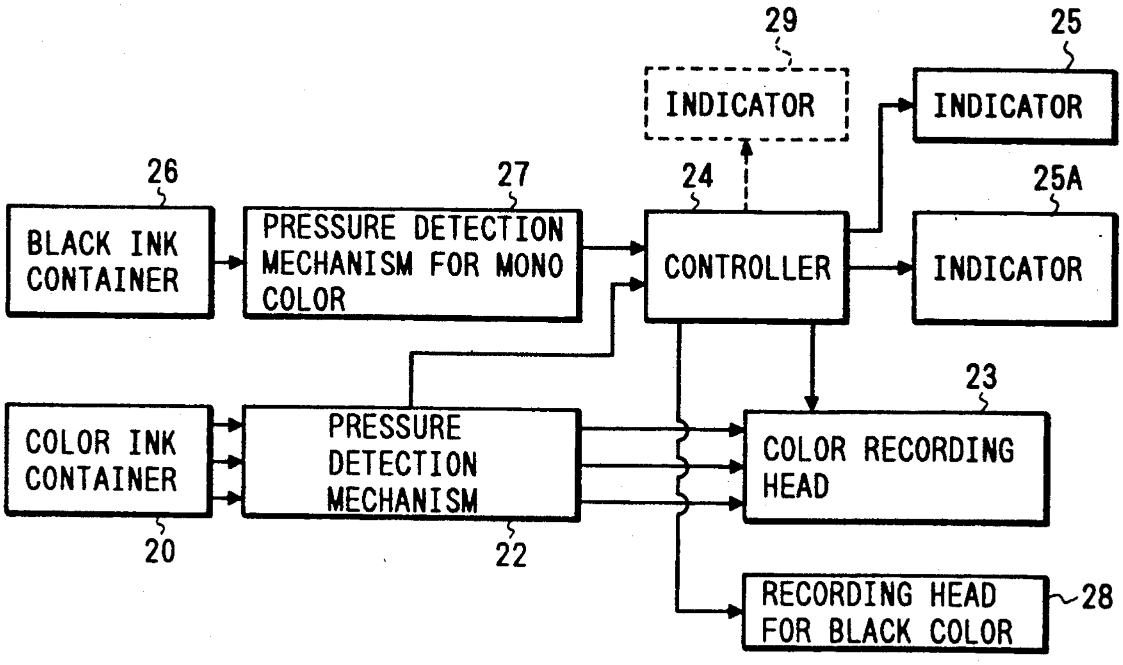
FIG. 7 is a block diagram showing another embodiment of the control system according to the present invention.

FIG. 7 is a block diagram showing another embodiment of the control system. In FIG. 7, the same reference numerals as in FIG. 6 denote the same parts and a detailed description thereof will be omitted. In addition, the arrangement of an ink quantity detecting device is the same as that of the third embodiment and a detailed description thereof will be omitted.

This embodiment is applicable to an ink jet recording apparatus of full color using black in addition to three colors of yellow, magenta, and cyan and comprises a black ink container 26 for black ink recording, a pressure detection mechanism 27 for mono color, and a black recording head 28. Color ink supply remaining detection is performed as shown in FIG. 2 or 5. A black ink supply remaining, however, is detected by the pressure detection mechanism 27 for mono color having the same arrangement as that shown in FIG. 1, and a controller 24 drives an indicator 25A on the basis of this detection to indicate the detected black ink supply remaining.

With this arrangement, a user who uses up only the black ink prior to inks of other colors can replace only the black ink container 26 having a short ink replacement period. When color recording is frequently performed, only a color ink container 20 need be replaced.

Therefore, ink replacement can be economically performed.

Figures 8A, 8B:
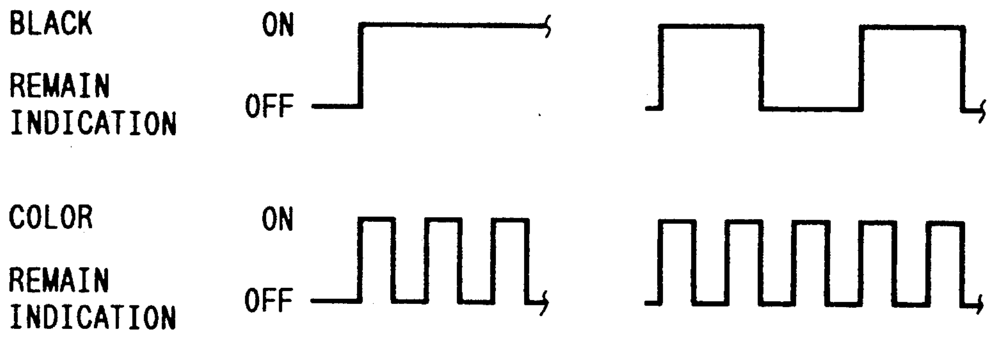
FIGS. 8A and 8B are timing charts showing another example of indicator driving methods.

In order to indicate an ink supply, a single indicator 29 may be turned on/off at different flashing periods in accordance with the colors of inks in place of the indicators 25 and 25A shown in FIG. 7 so that a user can check which of the black ink and color ink has an ink supply detected. FIG. 8A shows an arrangement in which the indicator is continuously turned on for black ink and flashed for color ink, and FIG. 8B shows an arrangement in which the indicator is flashed at a long period for black ink and at a short period for color ink.

The above third and fourth embodiments have the following effects.

That is, since a single indicator indicates a detected ink remain of each of a plurality of inks of different colors contained in a color ink container, this single indicator can alarm replacement of the ink container. As a result, the arrangement can be simplified, and the operability can be improved because ink replacement need not be performed for each ink color.

In addition, a black ink container containing black ink is provided in addition to the color ink container, and an ink supply remaining indicator and an ink supply remaining detecting means for this black ink container are exclusively provided. Therefore, black ink supply remaining indication and color ink supply remaining indication can be discriminated from each other to improve the operability.

Furthermore, since the single indicator indicates a color ink supply remaining and a black ink supply remaining at different ON periods, this single indicator can indicate both the black and color ink supply remains.

In the above embodiments, black ink and yellow, cyan, and magenta inks are exemplified as the main ink and secondary inks, respectively. However, if recording is performed by mainly using magenta ink, the main ink is magenta ink. Similarly, if recording is performed by mainly using cyan, the main ink is cyan ink. In this manner, a relationship between the main ink and the secondary inks can be arbitrarily set by a recording mode by the apparatus or a user. Such a technical principle can be applied to density recording using ihks of the same color but having different concentrations.

The present invention brings about excellent effects particularly in a recording head or a recording device for discharging ink by using heat energy among the various ink jet recording systems.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleus boiling corresponding to the recording information on electricity-heat converters arranged corresponding to the sheets or liquid channels holding a liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) though an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in U.S. Pat. No. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. No. 4,558,333, or 4,459,600 disclosing the constitution having the heat acting portion arranged in the flexed region is also included in the present invention. In addition, the present invention can be also effectively made by constitution as disclosed in Japanese Laid-Open Patent Application No. 59-123670 which discloses the constitution using a slit common to a plurality of electricity-heat converters as the discharging portion of the electricity-heat converter or Japanese Laid-Open Patent Application No. 59-138461 which discloses the constitution having the opening for absorbing pressure wave of heat energy correspondent to the discharging portion.

Further, as the recording head of the full line type having a length corresponding to the maximum width of a recording medium which can be recorded by the recording device, either the constitution which satisfies its length by a combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main device by being mounted on the main device.

Also, addition of a restoration means for the recording head, a preliminary auxiliary means, etc. provided as the constitution of the recording device of the present invention is preferable, because the effect of the present invention can be further stabilized. Specific examples of these may include, for the recording head, capping means, cleaning means, pressurization or suction means, electricity-heat converters or other types of heating elements, or preliminary heating means according to a combination of these, and it is also effective for performing stable recording to perform a preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

When the ink quantity detecting device of the present invention is applied to an ink jet recording apparatus for discharging ink by using heat energy generated by electricity-heat converters, a phenomenon in which a head having no ink therein is driven to damage the electricity-heat converters by heat can be avoided.

What is claimed is:

1. A device for detecting a decrease in ink amount, the device comprising:

a plurality of displacing members each provided on one of a plurality of corresponding ink chambers to be displaced in accordance with a decrease of ink in each said ink chamber;

a connecting member for connecting said plurality of displacing members to be displaced, when ink in at least one of said ink chambers decreases, in association with the displacement of said displacing member corresponding to said at least one ink chamber in accordance with the decrease of the ink, said connecting member including an integral conductive member;

an electrode fixed to a body of said device, said electrode being provided in a moving path of said conductive member; and a biasing member for biasing said connecting member and said displacing members in a same direction and for biasing said conductive member to be in contact with said electrode, wherein said conductive member remains in contact with said electrode when more than a predetermined amount of ink is contained in each of said ink chambers, and at least one of said displacing members is deformed in a direction against a direction of a biasing force of said biasing member and said connecting member is displaced in accordance with the movement of said at least one displacing member so that said conductive member is brought out of contact with said electrode when an ink amount in said ink chamber which corresponds to said at least one displacing member decreases and a pressure in said ink chamber becomes more negative than a predetermined pressure.

2. A method for detecting a decrease in ink amount comprising the steps of:

providing a plurality of displacing members on a plurality of corresponding ink chambers to be displaced in accordance with a decrease of ink in each said ink chamber;

a connecting member for connecting said plurality of displacing members to be displaced, when ink in at least one of said ink chambers decreases, in association with the displacement of said displacing member corresponding to said at least one ink chamber in accordance with the decrease of the ink, said connecting member inlcuding an integral conductive member;

providing an electrode at a position at which said electrode may contact said conductive member; and applying a biasing force to bias said connecting member and said displacing members in a same direction and to bias said conductive member to be in contact with said electrode, wherein said conductive member remains in contact with said electrode when more than a predetermined amount of ink is contained in each of said ink chambers, and at least one of said displacing members is deformed in a direction against a direction of the biasing force and said connecting member is displaced in accordance with the movement of said at least one displacing member so that said conductive member is brought out of contact with said electrode when an ink amount in said ink chamber which corresponds to said at least one displacing member decreases and a pressure in said ink chamber becomes more negative than a predetermined pressure.

3. A device for detecting a decrease in ink amount, the device comprising:

a plurality of displacing members each provided on one of a plurality of corresponding ink chambers to be displaced in accordance with a decrease of ink in each said ink chamber;

a connecting member for connecting said plurality of displacing members to be displaced, when ink in at least one of said ink chambers decreases, in association with the displacement of said displacing member corresponding to said at least one ink chamber in accordance with the decrease of the ink, said connecting member including a conductive member;

an electrode fixed to a body of said device, said electrode being provided at a position at which said electrode may contact said conductive member; and a biasing member for biasing said connecting member and said displacing member in a same direction and for biasing said conductive member to be in contact with said electrode, wherein said conductive member remains in contact with said electrode when more than a predetermined amount of ink is contained in each of said ink chambers, and at least one of said displacing members is deformed in a direction against a direction of a biasing force of said biasing member and said connecting member is displaced in accordance with the movement of said at least one displacing member so that said conductive member is brought out of contact with said electrode when an ink amount in said ink chamber which corresponds to said at least one displacing member decreases and a pressure in said ink chamber becomes more negative than a predetermined pressure.

4. A device according to claim 3, wherein said plurality of ink chambers are stacked.

5. A device according to claim 3, wherein each of said displacing members comprises a flexible member.

6. A device according to claim 3, further comprising regulating means for regulating the displacement of at least one of said displacing members is provided for corresponding ink chambers.

7. A device according to claim 3, wherein said detecting means optically detects a displacement quantity.

8. A device according to claim 3, wherein the pressure in each of said ink chambers is substantially equal to atmospheric pressure when there is sufficient ink in the ink chamber.

9. A device according to claim 3, wherein each of said displacing members forms a part of each corresponding ink chamber and includes a diaphragm member displaceable in accordance with a pressure of the ink.

10. A device according to claim 3, wherein said plurality of ink containers are accommodated in one ink containing member and each said ink container includes an ink outlet port communicable with the corresponding one of said plurality of ink chambers.

11. A device according to claim 3, wherein each of said displacing members is provided in a corresponding ink chamber for containing an ink of a different color.

12. A device according to claim 3, wherein said connecting member is displaced by displacement of at least one of said displacing members when ink in the corresponding ink chamber is less than a predetermined amount, even when the ink in the other ink chambers is more than a predetermined amount.

13. A recording apparatus having a recording means for recording with ink and an ink supply system for supplying ink to said recording means, said recording apparatus comprising:

a device for detecting a decrease in ink amount communicating with said ink supply system, said device having:

a plurality of displacing members each provided on one of a plurality of corresponding ink chambers to be displaced in accordance with a decrease of ink in each said ink chamber;

a connecting member for connecting said plurality of displacing members to be displaced, when ink in at least one of said ink chambers decreases, in association with the displacement of said displacing member corresponding to said at least on ink chamber in accordance with the decrease of the ink, said connecting member including an integral conductive member, an electrode fixed to a body of said device, said electrode being provided at a position at which said electrode may contact said conductive member; and a biasing member for biasing said connecting member and said displacing member in a same direction and for biasing said conductive member to be in contact with said electrode, wherein said conductive member remains in contact with said electrode when more than a predetermined amount of ink is contained in each of said ink chambers, and at least one of said displacing members is deformed in a direction against a direction of a biasing force of said biasing member and said connecting member is displaced in accordance with the movement of said at least one displacing member so that said conductive member is brought out of contact with said electrode when an ink amount in said ink chamber which corresponds to said at least one displacing member decreases and a pressure in said ink chamber becomes more negative than a predetermined pressure.

output means for outputting detection results from said device.

14. An apparatus according to claim 13, wherein said recording means comprises an ink jet recording head for discharging ink by using heat energy.

15. An apparatus according to claim 13, wherein said recording means includes as electrothermal converting member for generating heat energy.

16. An apparatus according to claim 13, wherein each of said displacing members is provided in a corresponding ink chamber for containing an ink of a different color.

17. An apparatus according to claim 13, wherein said connecting member is displaced by displacement of at least one of said displacing members when ink in the corresponding ink chamber is less than a predetermined amount, even when the ink in the other ink chambers is more than a predetermined amount.

18. An apparatus according to claim 13, wherein said ink supply system includes ink containing means, detachably mounted on said recording apparatus, for containing a plurality of types of ink.

19. An apparatus according to claim 13, wherein said ink supply system includes a supply system for a main ink and a supply system for a secondary ink, said main ink supply system including ink quantity detecting means separate from said ink quantity detecting device.

20. An apparatus according to claim 19, further comprising second output means for outputting detection results from said ink quantity detecting means for detecting a quantity of the main ink.

21. An apparatus according to claim 19, wherein detection results from said ink quantity detecting means for detecting a quantity of the main ink is output to said output means.

22. An apparatus according to claim 21, wherein the output of the detection results of the main ink quantity is different from an output of a detection results of a quantity of the secondary ink.

23. An apparatus according to claim 22, wherein said output means includes a lamp and the detection results are output in a plurality of modes using different lamp on periods.

24. An apparatus according to claim 10, wherein the main ink is black ink, and the secondary ink is at least one of yellow, cyan, and magenta inks.

25. A copying apparatus having a recording means for recording with ink and an ink supply system for supplying ink to said recording means, said copying apparatus comprising:

a device for detecting a decrease in an ink amount communicating with said ink supply system, said device having:

a plurality of displacing members each provided on one of a plurality of corresponding ink chambers to be displaced in accordance with a decrease of ink in each said ink chamber;

a connecting member for connecting said plurality of displacing members to be displaced, when ink in at least one of said ink chambers decreases, in association with the displacement of said displacing member corresponding to said at least on ink chamber in accordance with the decrease of the ink, said connecting member including a conductive member, an electrode fixed to a body of said device, said electrode being provided at a position at which said electrode may contact said conductive member; and a biasing member for biasing said connecting member and said displacing member in a same direction and for biasing said conductive member to be in contact with said electrode, wherein said conductive member remains in contact with said electrode when more than a predetermined amount of ink is contained in each of said ink chambers, and at least one of said displacing members is deformed in a direction against a direction of a biasing force of said biasing member and said connecting member is displaced in accordance with the movement of said at least one displacing member so that said conductive member is brought out of contact with said electrode when an ink amount in said ink chamber which corresponds to said at least one displacing member decreases and a pressure in said ink chamber becomes more negative than a predetermined pressure.

output means for outputting detection results from said device.

26. A facsimile apparatus having a recording means for recording with ink and an ink supply system for supplying ink to said recording means, said facsimile apparatus comprising:

a device for detecting a decrease in ink amount communicating with said ink supply system, said device having:

a plurality of displacing members each provided on one of a plurality of corresponding ink chambers to be displaced in accordance with a decrease of ink in each said ink chamber;

a connecting member for connecting said plurality of displacing members to be displaced, when ink in at least one of said ink chambers decreases, in association with the displacement of said displacing member corresponding to said at least on ink chamber in accordance with the decrease of the ink, said connecting member including a conductive member;

an electrode fixed to a body of said device, said electrode being provided at a position at which said electrode may contact said conductive member, and a biasing member for biasing said connecting member and said displacing member in a same direction and for biasing said conductive member to be in contact with said electrode, wherein said conductive member remains in contact with said electrode when more than a predetermined amount of ink is contained in each of said ink chambers, and at least one of said displacing members is deformed in a direction against a direction of a biasing force of said biasing member and said connecting member is displaced in accordance with the movement of said at least one displacing member so that said conductive member is brought out of contact with said electrode when an ink amount in said ink chamber which corresponds to said at least one displacing member decreases and a pressure in said ink chamber becomes more negative than a predetermined pressure.

output means for outputting detection results from said device.

27. A video output printer having a recording means for recording with ink and an ink supply system for supplying ink to said recording means, said video output printer comprising:

a device for detecting a decrease in ink amount communicating with said ink supply system, said device having:

a plurality of displacing members each provided on one of a plurality of corresponding ink chambers to be displaced in accordance with a decrease of ink in each said ink chamber;

a connecting member for connecting said plurality of displacing members to be displaced, when ink in at least one of said ink chambers decreases, in association with the displacement of said displacing member corresponding to said at least on ink chamber in accordance with the decrease of the ink, said connecting member including a conductive member, an electrode fixed to a body of said device, said electrode being provided at a position at which said electrode may contact said conductive member; and a biasing member for biasing said connecting member and said displacing member in a same direction and for biasing said conductive member to be in contact with said electrode, wherein said conductive member remains in contact with said electrode when more than a predetermined amount of ink is contained in each of said ink chambers, and at least one of said displacing members is deformed in a direction against a direction of a biasing force of said biasing member and said connecting member is displaced in accordance with the movement of said at least one displacing member so that said conductive member is brought out of contact with said electrode when an ink amount in said ink chamber which corresponds to said at least one displacing member decreases and a pressure in said ink chamber becomes more negative than a predetermined pressure.

output means for outputting detection results from said device.

28. A word processor having a recording means for recording with ink and an ink supply system for supplying ink to said recording means, said word processor comprising:

a device for detecting a decrease in ink amount communicating with said ink supply system, said device having:

a plurality of displacing members each provided on one of a plurality of corresponding ink chambers to be displaced in accordance with a decrease of ink in each said ink chamber;

a connecting member for connecting said plurality of displacing members to be displaced, when ink in at least one of said ink chambers decreases, in association with the displacement of said displacing member corresponding to said at least on ink chamber in accordance with the decrease of the ink, said connecting member including a conductive member, an electrode fixed to a body of said device, said electrode being provided at a position at which said electrode may contact said conductive member, and a biasing member for biasing said connecting member and said displacing member in a same direction and for biasing said conductive member to be in contact with said electrode, wherein said conductive member remains in contact with said electrode when more than a predetermined amount of ink is contained in each of said ink chambers, and at least one of said displacing members is deformed in a direction against a direction of a biasing force of said biasing member and said connecting member is displaced in accordance with the movement of said at least one displacing member so that said conductive member is brought out of contact with said electrode when an ink amount in said ink chamber which corresponds to said at least one displacing member decreases and a pressure in said ink chamber becomes more negative than a predetermined pressure; and output means for outputting detection results from said device.

* * * * *

UNITED STATES PATENT AND TRADEMARK OFFICE
CERTIFICATE OF CORRECTION

PATENT NO. : 5,315,317
DATED : May 24, 1994
INVENTOR(S) : KOJI TERASAWA, ET AL.

It is certified that error appears in the above-identified patent and that said Letters Patent is hereby corrected as shown below:

ON TITLE PAGE

In [54] Title: "DEVIE" should read --DEVICE--.

COLUMN 1

Line 3, "DEVIE" should read --DEVICE--.

COLUMN 4

Line 38, "by" should be deleted.

COLUMN 5

Line 40, "findings an ink in" should read --findings,--.
Line 43, "remains" should read --remaining--.
Line 66, "200 mmAg" should read -- -200 mmAg--.

COLUMN 6

Line 24, "suply" should read --supply--.

COLUMN 7

Line 21, "remain" should read --supply remaining--.
Line 22, "remain" should read --supply remaining--.
Line 68, "supply" should read --supply remaining--.

UNITED STATES PATENT AND TRADEMARK OFFICE
CERTIFICATE OF CORRECTION

PATENT NO. : 5,315,317

DATED : May 24, 1994

INVENTOR(S) : KOJI TERASAWA, ET AL.

It is certified that error appears in the above-identified patent and that said Letters Patent is hereby corrected as shown below:

COLUMN 9

Line 3, "supply," should read --supply remaining,--.
Line 8, "supply" should read --supply remaining--.
Line 48, "energy" should read --energy,--.

COLUMN 11

Line 45, "a connecting member for connecting" should read --connecting with a connecting member--.
Line 51, "inlcuding an integral" should read --including a--.

COLUMN 13

Line 22, "on" should read --one--.
Line 48, "pressure." should read --pressure; and--.
Line 55, "as" should read --an--.

COLUMN 14

Line 18, "a" (first occurrence) should be deleted.
Line 23, "on" should read --ON--.
Line 24, "claim 10," should read --claim 19,--.
Line 42, "on" should read --one--.
Line 59, "against" should read --opposite--.
Line 68, "pressure." should read --pressure; and--.

COLUMN 15

Line 7, "ink" should read --an ink--.
Line 18, "on" should read --one--.

UNITED STATES PATENT AND TRADEMARK OFFICE
CERTIFICATE OF CORRECTION

PATENT NO. : 5,315,317
DATED : May 24, 1994
INVENTOR(S) : KOJI TERASAWA, ET AL.

It is certified that error appears in the above-identified patent and that said Letters Patent is hereby corrected as shown below:

COLUMN 15

Line 35, "against" should read --opposite--.
Line 45, "pressure." should read --pressure; and--.
Line 52, "ink" should read --an ink--.
Line 63, "on" should read --one--.

COLUMN 16

Line 12, "against" should read --opposite--.
Line 21, "pressure." should read --pressure; and--.
Line 23, "device." should read --ink amount detecting device.--.
Line 28, "ink" should read --an ink--.
Line 39, "on" should read --one--.
Line 56, "against" should read --opposite--.

Signed and Sealed this

Eighteenth Day of October, 1994

Attest:

BRUCE LEHMAN

Attesting Officer

*Commissioner of Patents and Trademarks*